United States Patent Office 3,456,789
Patented July 22, 1969

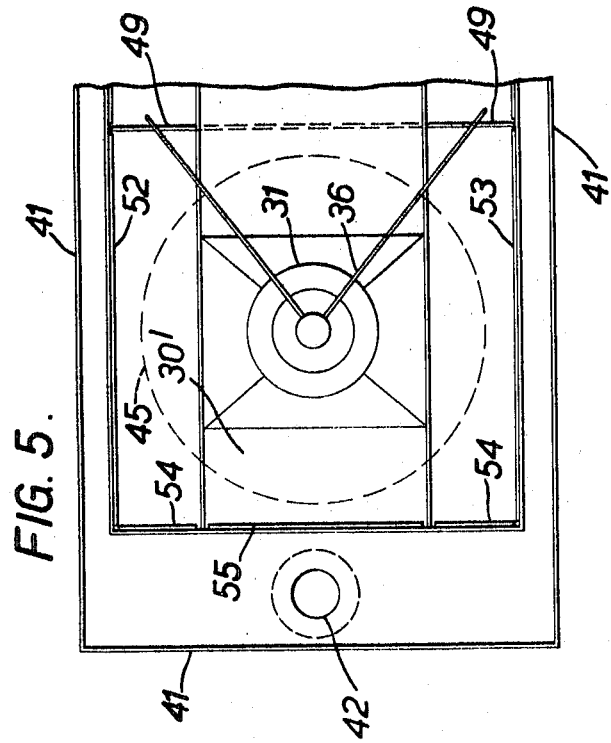
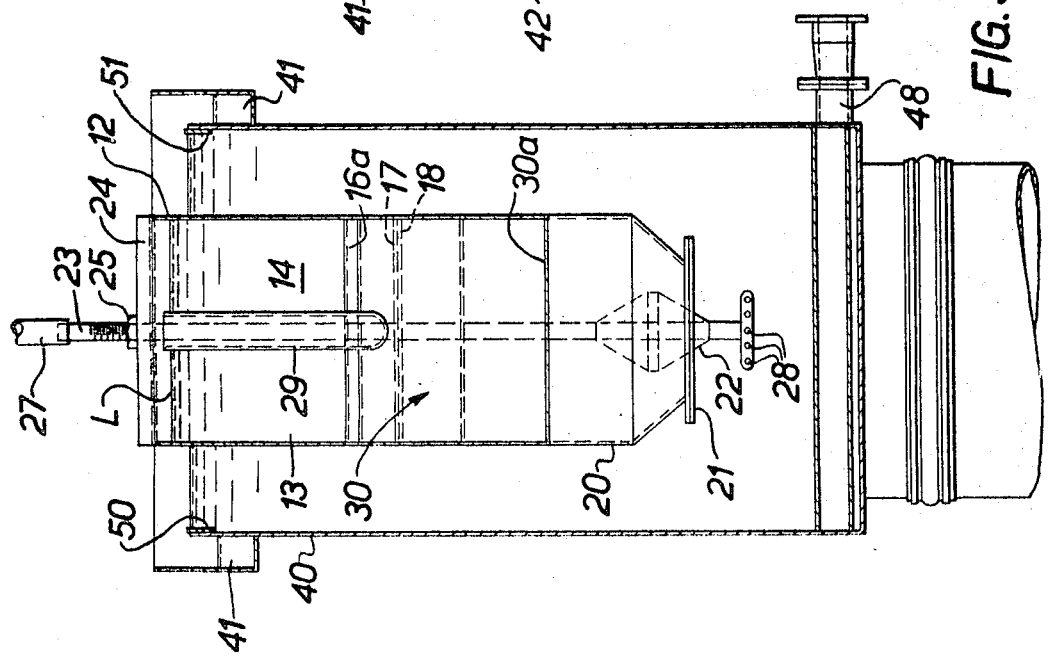

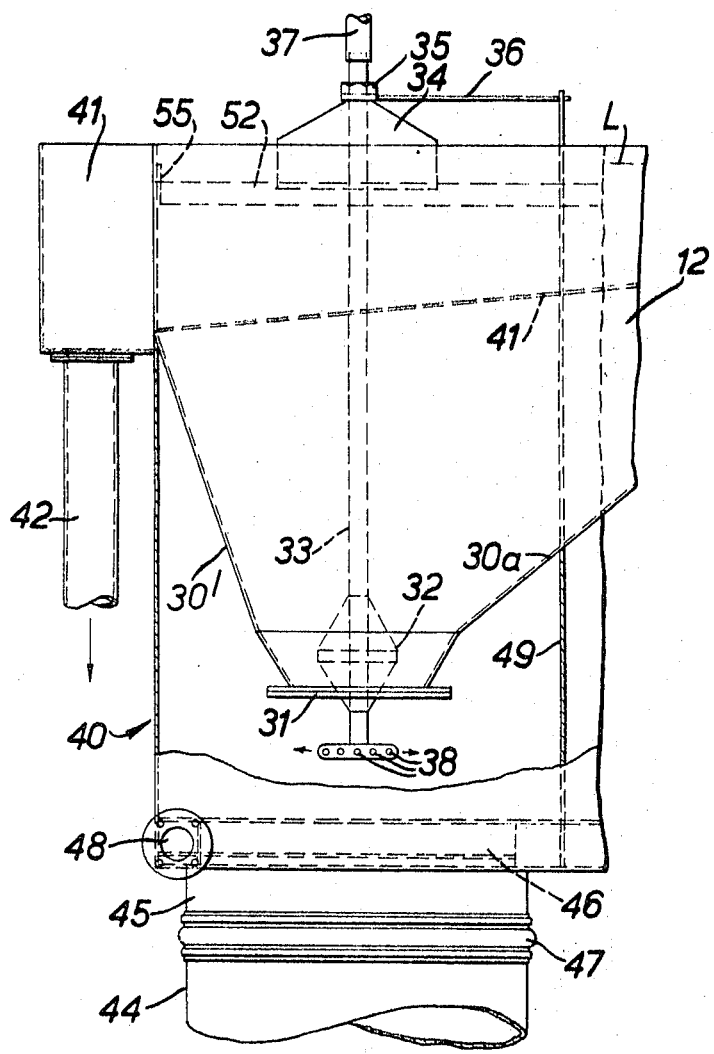

3,456,789
CLASSIFIERS FOR GRADING SOLID PARTICLES IN A LIQUID SUSPENSION
John Degory Baron Phipps, Crick, near Rugby, England, assignor to Floatex Separations Limited, London, England, a British company
Filed Mar. 10, 1967, Ser. No. 622,358
Claims priority, application Great Britain, Mar. 11, 1966, 10,702/66
Int. Cl. B03d 3/00, 1/00
U.S. Cl. 209—156  12 Claims

ABSTRACT OF THE DISCLOSURE

A classifier for grading raw suspensions of granular materials in water or other liquids is provided with a load-sensitive vertically reciprocable discharge hopper for the solids the outlet from which is automatically controlled so as to maintain a relatively steady flow of graded solids. At the same time, a high-level offtake for the residual fines suspension at approximately the same height as the mean water level in the classifier enables a cyclone or other form of separator to be gravity fed for the recovery of usable fines from the outflow. Countercurrent flow conditions can be established at the entry to each solids hopper to improve the accuracy of the grading by entraining unwanted fine material which is carried over with the wanted coarser grade material.

---

This invention relates to classifiers for grading solid particles in a liquid suspension—for example, sands or gravels in water. Hereinafter, for convenience of terminology, the words "sand" and "water" will be deemed to include "solids" and "liquid" generally unless repugnant to the context. More particularly, the invention concerns classifiers of the general kind (hereinafter referred to as the kind described) such as is disclosed is British Patent No. 779,013 and in which a receiver to one end of which the raw or ungraded suspension is delivered is divided into a plurality of successive compartments intercommunicating in series and comprising at least a preliminary flow stabilising chamber and two grading compartments separated by a wall or weir below the free surface of the water. The first grading compartment receives substantially the whole of the coarser fraction of the sand in suspension and the second receives substantially the whole of the finer fraction. At least the first grading compartment discharges solids downwards, preferably under the control of a valve or obturator. It is also usual to provide an inlet chamber or so-called boiling box which communicates with the flow stabilising chamber by way of an aperture below the mean working water level in the boiling box, whilst the flow stabilising chamber has a flat floor terminating at its downstream end in an upstanding lip against which sand initially piles up to form an upwardly convex bank. The contour of the free surface of the sand bank assumes a shape which remains substantially constant during operation of the classifier and serves to control the flow pattern to subsequent grading compartments. The downstream part of the flat floor is preferably adjustable in the general direction of flow through the stabilising chamber to vary the gap between the lip and the low wall or weir separating the first and second grading compartments so as to afford a means for controlling the particle grade at which the split between coarse and fine particles occurs.

It is an object of the present invention to improve the efficiency and performance of classifiers of the kind described.

According to the present invention, a classifier of the kind described has at least one grading compartment below which is located a vertically displaceable hopper for graded solids which is adapted to move downwards on collection therein of a predetermined weight of graded particles, the outlet from the hopper being controlled by a valve responsive to relative vertical displacements of the hopper. An overflow opens into the water space at the top of the receiver for drawing off excess water and any suspended fine particles.

Preferably, a launder or overflow trough communicates with the receiver at or close to its top edge.

Conveniently, a laterally inward or converging flow pattern of clean water is established immediately above the entry to the hopper so as to produce an upward current of water through the inlet to the grading compartment through which the graded particles discharged from the orifice must fall. Thus, silt or "fines" entrained with the graded particles can be removed before they collect in the hopper.

In addition to the above convergent flow pattern of countercurrent water, the graded particles falling from a discharge orifice may also be subjected to a laterally outward or divergent flow pattern of clean water immediately adjacent the orifice—for example, by combining with each compartment discharge valve assembly (where provided) a hollow supporting stem whose upper end is connected to a supply of clean water, and which terminates below the valve head in a series of radial nozzles. Thus, the falling graded particles are constrained to follow a tortuous path from the orifice to the hopper during which time they are exposed to countercurrent flow conditions which promote a more efficient separation of fines from graded particles.

One of the orifice control valve rods may be suspended from a float or they may both be suspended from fixed brackets secured to the tank walls above the normal level of the water.

The tank may enclose all the grading compartments, in which case it preferably has an internal partition for isolating the graded compartment discharge orifices, together with their respetcive hoppers, from each other so that graded particles from one grading compartment are substantially prevented from mixing with graded particles from any other grading compartment, and also so that water currents rising to the overflow can be separated for independent control.

In an alternative construction the material overflowing from a grading compartment is collected in an adjacent chamber from which it is drawn off at the desired mean water level for delivery to a cyclone or like separator for removing silt and similar very fine contaminant material.

Practical embodiments of the present invention will now be described by way of example only with reference to the accompanying drawings in which:

FIGURE 3 is a fragmentary sectional view on the line III—III of FIGURE 1;

FIGURE 4 is a fragmentary side elevation similar to FIGURE 1 showing a modified construction;

FIGURE 5 is a plan view of FIGURE 4;

Figure 1:
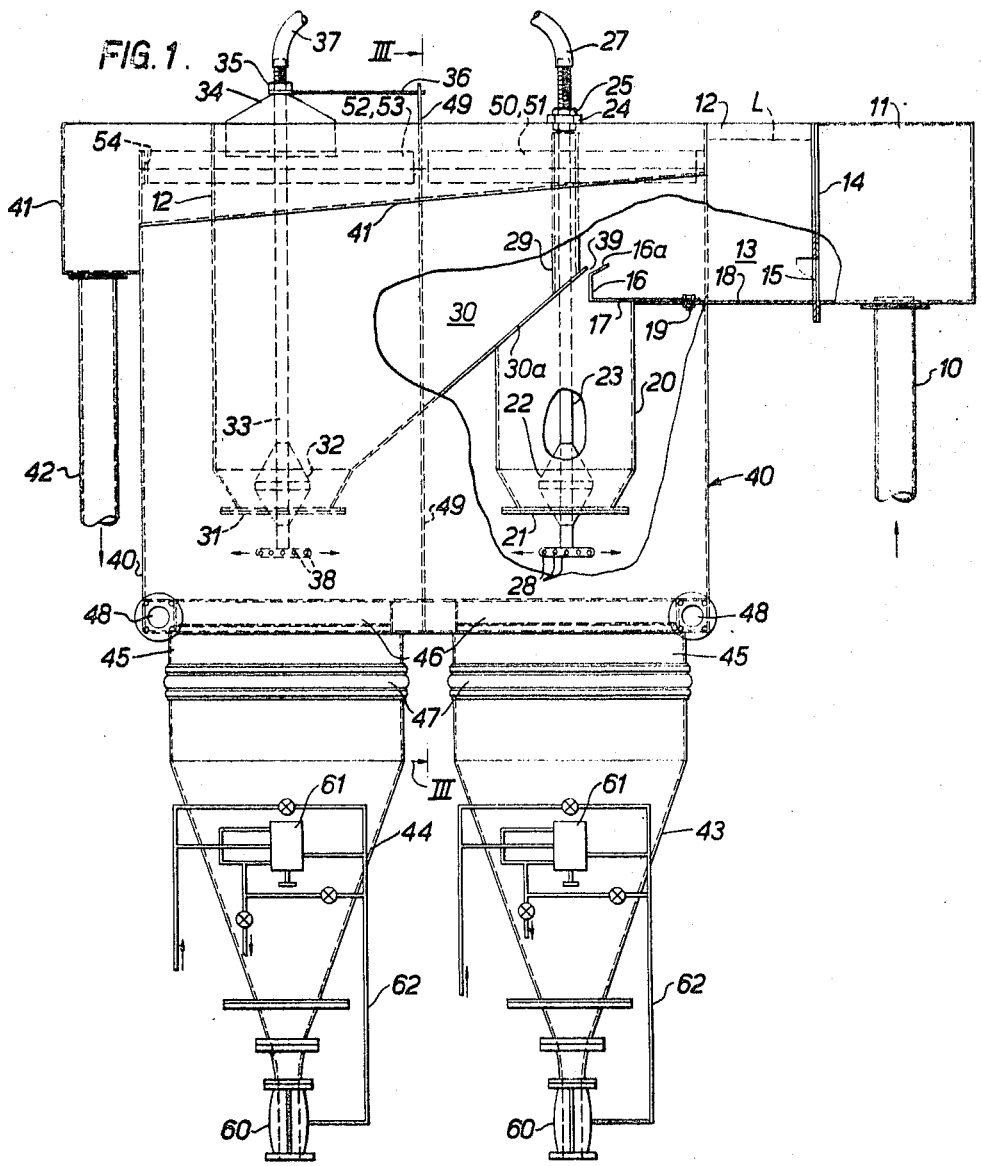
FIGURE 1 is a side elevation (partly broken away) of a first form of classifier for producing two grades of particles.
Figure 2:
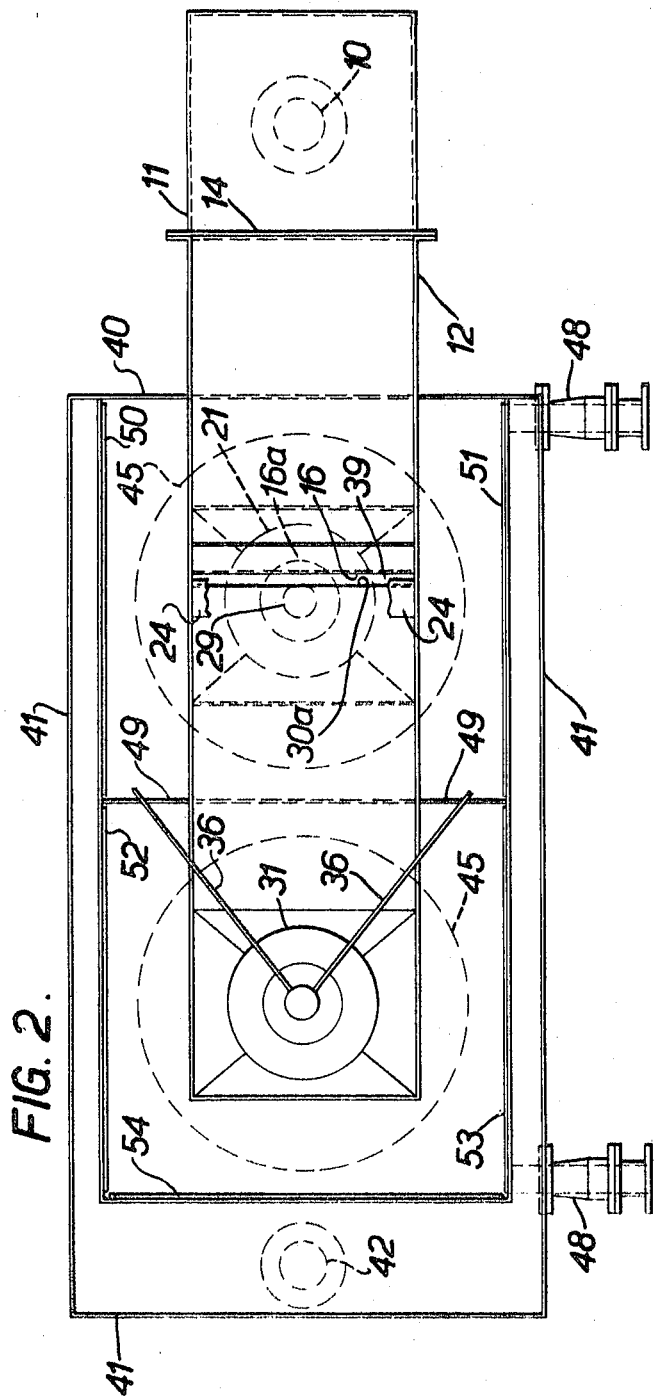
FIGURE 2 is a plan view of FIGURE 1 omitting the orifice control valves.

Referring first to FIGURES 1 to 3, raw suspension to be treated is delivered through a pipe 10 to a boiling box 11 at one end of a classifier unit 12 of the kind described. The boiling box 11 is separated from the adjacent flow stabilising chamber 13 by a partition 14 having an aperture 15 at its lower end. The floor of the chamber 13 is flat and terminates at its downstream end in an unturned transverse lip 16 having a re-entrant or backward sloping marginal section 16a. The lip 16 forms the trailing or discharge edge of a tray 17 which is slidable, in the direction of flow of water through the chamber, over the main floor 18 of the chamber and can be clamped in any desired position by set bolts 19.

The rearward or downstream edge of the main floor 18 meets the top of the adjacent vertical wall of a chute 20 constituting the first grading compartment. The lower end of this chute is frustoconical and terminates in a discharge orifice 21. The orifice is of fixed diameter and a double conical valve head 22 is suspended coaxially within it on a vertical tubular rod 23. The upper end of this rod is adjustably supported in a bridge 24 by means of a height adjustment nut 25. The mean water level within the classifier unit 12 is indicated at L.

The suspension rod 23 is tubular and passes through the valve head 22 to carry at its lower end, below the discharge orifice 21, a ring of radial nozzles 28. These are fed with clean water under pressure through a valve-controlled flexible pipe 27 fixed to the top of the tubular rod 23. From a point just above the water level L, the suspension rod passes with clearance down through a guard sleeve 29 which serves as a shield protecting the valve rod 23 from exposure to lateral thrusts from the flow of water along the classifier 12. The bottom end of the guard sleeve 29 is mounted on a sloping wall 30a of a second chute 30 constituting the second grading compartment. This chute has a discharge orifice 31 and double conical control valve head 32 similar to the corresponding parts of the first chute 20. The tubular suspension rod 33 of the valve head 32 is carried on a float 34 by means of a height adjustment nut 35. This float is tied by rods 36 to the top of a fixed partition 49 (see below) between the chutes 20, 30. The lower end of the suspension rod 33 carries radial nozzles 38, similar to the nozzles 28, below the discharge orifice 31 and is similarly supplied with water under pressure through a valve-controlled flexible pipe 37 secured to the top of the tubular rod 33. Alternatively, the float 34 can be omitted entirely, the upper end of the tubular suspension rod 33 being mounted in another transverse bridge structure.

The function of the float 34, when used, is to maintain a constant water level in the classifying tank despite fluctuations in rate of feed of suspensions of granular material to the boiling box 11. At high rates of feed of solids to the boiling box 11, the water level in the classifier unit 12 will tend to fall and the float also falls to close its orifice control valve and allow a reduced flow of water through the grading compartments 20, 30. At low rates of feed of solids, the reverse action takes place, thus maintaining a more constant head of water in the classifier unit 12. The proportions in which the water delivered by the pipe 10 into the boiling box 11 divides between the chutes 20, 30 can then be set by adjusting the nut 25 only, once and for all, for each installation. This arrangement will suit most installations best and takes care of the water flow into the chutes 20 and 30.

The sloping wall 30a of the second chute defines, with the sliding tray 17, the upper end of the first chute 20, and is at approximately 40° to the horizontal. The portion 16a of the lip 16, from which the upper edge of the sloping wall 30a is separated by a gap 39 whose width is determined by the setting of the tray 17 slopes backward at an angle of approximately 30°. This gap constitutes the inlet to the first chute or grading compartment 20. The angle of inclination of the surfaces 16a and 30 is fairly critical.

The proportions in which the sand divides between the chutes 20, 30 bear no relation to the proportionate division of the water, and are settled by the adjustment of the sliding plate 17. For instance, if the gap 39 is wide—say, 10 inches—60% of the water and 90% of the sand may flow into the chute 20, and in this case the 10% of sand which flows into the chute 30 is what is called a fine cut—nothing coarser than 14 mesh, and probably only 2% coarser than 25 mesh.

If the gap is narrowed down to ⅞ inch (which is about the lowest practical limit) 60% of the water may still flow into the chute 20, with 50% of the sand. The latter would then be a coarse grade, and the sand which flows into the chute 30 would become a medium grade.

Narrowing the gap 39 thus makes both sands coarser, whilst widening it makes both sands finer.

The classifier unit 12 is rectangular in plan, open at the top, and is mounted in a rectangular outer casing or tank 40, the boiling box 11 and part of the stabilising chamber 13 projecting from one end wall of the tank. The tank encloses the grading compartments or chutes 20, 30 with clearance on all sides and below the radial nozzles 28, 38. Along two sides and the end remote from the boiling box 11 it has a launder or overflow channel 41 leading to an offtake 42.

The launder 41 receives water spilling over adjustable weirs at 50, 51, 52, 53 on the side walls of the tank 40. A fifth weir 54 is mounted on the end wall of the tank 40 remote from the boiling box 11. The flow over the weirs 50, 51 shows the flow through the first chute 20 and that over the weirs 52, 53, 54 shows the flow through the second chute 30.

The weirs are all independently adjustable, but in practice weirs 50 and 51 would be so set that the depth of water overflowing each would be as near as possible equal. Similarly, the weirs 52, 53 and 54 will in practice be set to give equal depths of overflow, but these last three would not necessarily be set so that the depth of water overflowing them was equal to that overflowing the weirs 50 and 51. More probably, the total volume rate of overflow over the weirs 50 and 51 might be made equal to that overflowing the weirs 52, 53 and 54, in which case the depth of water over the latter weirs would be less because their total length is greater than the total length of the weirs 50 and 51.

One particular case where an end overflow weir 55 on the classifier 12 may be required is in dredging operations, when the proportion of sand to water coming up the feed pipe 10 is subject to violent fluctuation.

The volume pumped by a pump is greatest when no sand is in suspension. The specific gravity of the mixture is then 1. On full sand load of 1 ton of sand to 2 tons of water, the specific gravity increases to 1.25 and the total volume pumped drops slightly, by an amount equivalent to a drop of ½ inch in the water overflow level in the classifier, the water level being usually set at 1¼ inch when pumping water only.

If the mixture is increased above the specific gravity of 1.25, the volume pumped begins to decrease more rapidly until, on overloads, there ceases to be an overflow altogether.

The pump is then in danger of choking, and sand pumps which receive their feed of sand and water from dredging pumps are particularly subject to this danger. In these cases, the positions of both valves 22 and 32 are fixed to give an end overflow from the classifier of approximately 1¼ inch when pumping water only, and a standard float switch inside the classifying tank warns the operator of the dredging plant to withdraw his suction slightly and thus reduce the sand load.

The adjustable weir 55 is, therefore, normally only used to control the flow when overloads of sand may reach the sand pump, as in the case of dredging plants or when there may be a sudden increase in the proportion of sand to gravel, as sometimes happens in "dry" pits from which excavated sand is fed to the treatment plant in a damp or dry condition.

The base of the tank 40, which is spaced a short distance below the discharge orifices 21, 31 carries two large diameter particle hoppers 43, 44, each coaxial with a respective associated discharge orifice 21, 31. Each hopper 43, 44 is suspended by load cells (not shown) from a short cylindrical spigot 45 carried on the base of the tank 40. Each spigot is embraced by a volute chamber 46 supplied with clean water under pressure by pipes 48. The internal wall of each volute chamber 46 is either pierced at intervals by nozzles which provide radially inwardly directed jets of water, or continuously slotted to provide an inward curtain. Each hopper 43, 44 is sealed to its spigot 45 by means of a flexible gaiter 47 which allows the respective hopper a limited freedom of relative vertical displacement. The load cells are preadjusted so as to support their respective hopper in its fully raised position when the tank 40 and the hoppers are full of water.

The bottom of each hopper is closed by a conventional outlet valve 60—preferably of a known type comprising a generally cylindrical or barrel-shaped body within which is sealed at each end a flexible tubular sleeve capable of compression radially to close the passage through it. The space between the sleeve and the body of the outlet valve is sealed by the top and bottom ends of the sleeve and is connected at 62 to a source (not shown) of fluid under pressure or to exhaust through a change-over valve 61 operated by relative vertical displacement of the hopper 43 or 44 and the spigot 45.

Thus, when a hopper and the tank 40 are full of water only, the outlet valve is closed. When it begins to fill with sand discharged from the respective grading compartment or chute 20 or 30, the load cells supporting that hopper begin to deflect and the hopper moves downward, moving the change-over valve 61. At a predetermined sand load in the hopper, the change-over valve opens the pressure fluid space within the outlet valve body 60 to exhaust, thus allowing the valve to open and discharge its sand load. The hopper then rises, operates the change-over valve, and causes the outlet valve to re-close. During normal operation of the plant, an equilibrium state tends to be established in which the hopper outlet valve is at least partly open so long as graded sand is being delivered to the hopper. The arrangement is described and illustrated in the specification and drawings of the co-pending patent application No. 454,848 (now abandoned).

The tank 40 has an internal vertical partition 49 extending for the full depth of the tank between the grading compartments or chutes 20, 30 to separate the discharge orifice 21 and hopper 43 from the orifice 31 and hopper 44.

In operation, the tray 17 is adjusted to give the width of gap 39 which corresponds to the required split between the grades of sand. The raw suspension is then delivered to the boiling box 11 and begins to flow through the aperture 15 into the stabilising chamber 13 where sand banks up in front of the lip 16. When this has built up to its natural surface contour, the tank 40 and hoppers 43, 44 are full of water.

The incoming raw suspension flows on into the grading chutes 20, 30, the coarser particles falling through the gap 39 into the first chute 20 and the finer particles being carried over into the second chute 30. The discharge orifice control valves 22, 32 are adjusted to suit the rate of discharge of water, and surplus water overflows into the launder 41 at the top of the tank 40, carrying with it a proportion of fines and silt. From the launder, this mixture can then be either discharged to waste or fed to auxiliary separating equipment, such as cyclones, which can be located at or just below the level of the outlet valve 60. The fine sand recovered by the auxiliary equipment can be collected separately or fed back into one or both streams of sand from the outlet valve 60. The high level of the discharge from the launder 41 thus renders possible the design of a more compact and versatile grading plant than hitherto.

If too high a proportion of fine particles is being carried down either hopper 43 or 44, the lateral nozzles 28 or 38 and those fed by the volute chambers 46 are supplied with clean water to establish a tortuous flow path from the discharge orifice 21 or 31 to the respective hopper 43 or 44 and to supplement the natural upward current of water rising to the launder 41. Consequently, the graded particles falling into the hopper are subjected for a longer period of time to an increased countercurrent flow, and an improved separation of entrained fines and silt is achieved.

In the modification illustrated in FIGURES 4, and 5, the downstream end wall 30' of the classifier unit 12 is inclined forwards and upwards to meet the end wall of the tank 40. The weir 54 is divided into two narrow sections, one either side of the classifier unit 12, whilst an independent weir 55 occupies the intermediate space at the top of the section of the end wall which is now common to the classifier unit 12 and tank 40. A float-controlled alarm switch can be fitted in the classifier 12 to warn of any excessive danger in the mean water level L.

Figure 6:
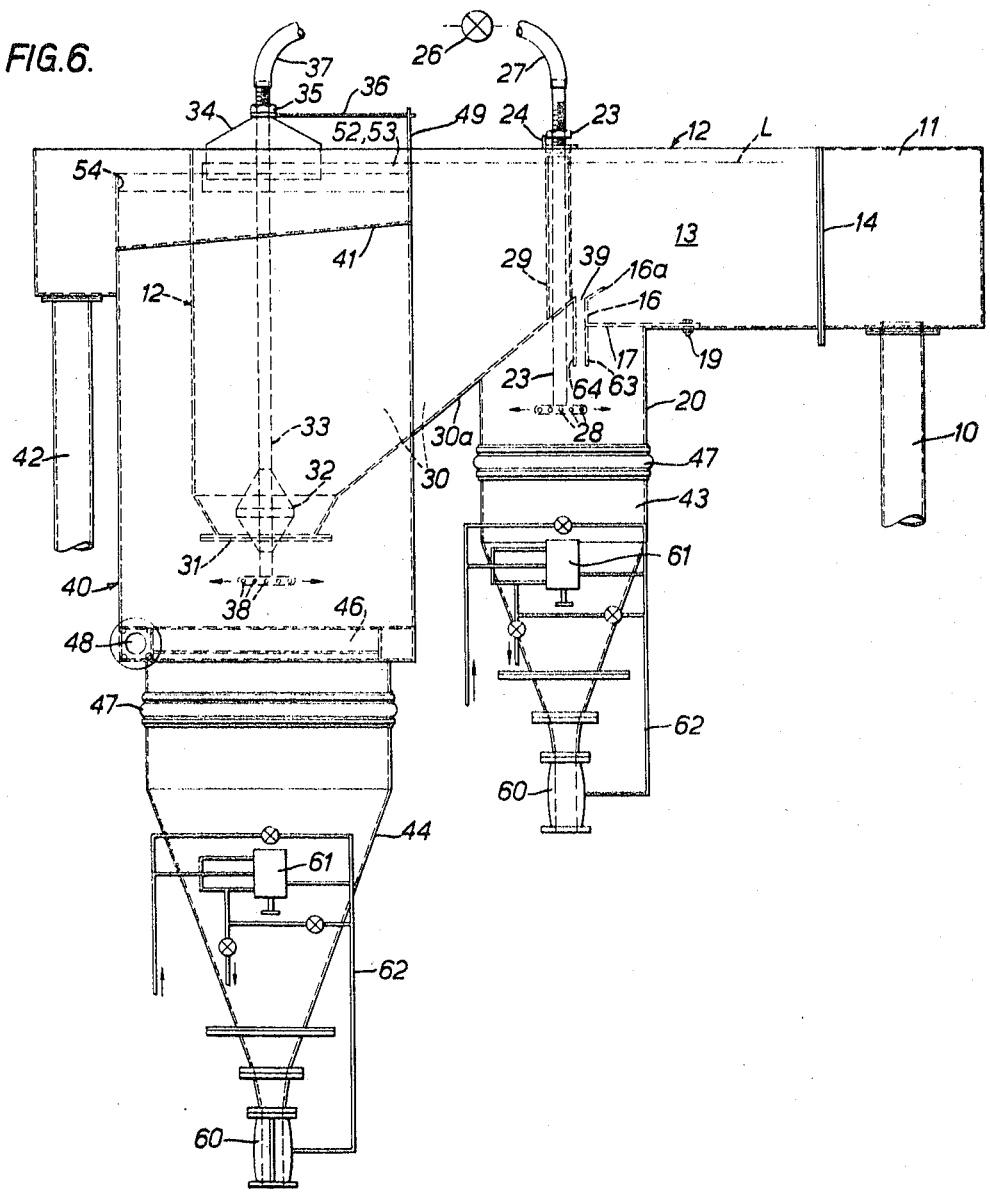
FIGURE 6 is a view similar to FIGURE 1 of another modification.

The modified construction illustrated in FIGURE 6 may be used to achieve an accurate split at a given minimum particle size to give a high quality coarse product—say, filter sand—where particle sizes below 25 or 50 mesh are to be wholly or substantially wholly excluded.

All sand particles when falling freely under gravity in still water reach a terminal velocity depending on their size. Hence, particles above a given size will fall against a given velocity of upward current. In a classifier of the kind described, coarse particles run down the downstream face of the sand bank built up ahead of the sloping edge 16a of the lip 16 of the adjustable tray 17 into the first chute or compartment 20 through the gap 39. Hence in FIGURE 6 the first chute 20 is placed outside the tank 40, and the required upward current velocity in the gap 39 is regulated by the supply of water to the radial nozzles 28. A pair of slightly downwardly divergent walls 63, 64 depend from the edges of the gap for a short distance, preferably of the order of 8 inches, to stabilize the flow through the gap.

The chute 20 has no discharge orifice and control valve therefor, and communicates direct with the discharge hopper 43. There is no volute chamber 46 at the entry to the hopper, the whole of the necessary upward current flow being provided by the radial nozzles 28.

In operation, the tray 17 is adjusted to give the required width of gap 39. The raw suspension feed pump is started, the water level in the classifier unit 12 is brought up to the line L, and the sand first builds up in a bank behind the lip 16. Thereafter, the classifier commences to split the raw input in the normal manner, the coarser particles falling through the gap 39 and passage between the walls 63, 64. The countercurrent flow through the passage and gap is carefully controlled by adjustment of the control valve 26 in the pipe 27 to provide the upward current velocity which will carry with it particles of less than 25 mesh size. These are carried over into the second compartment or chute 30 for further separation.

Consequently, the hopper 43 fills with sand of the correct grading.

The use of load-sensitive hoppers 43, 44 for the collection and discharge of graded sand permits a steadier flow of graded sand from the classifier with a higher load sensitivity than has been possible hitherto. This permits the use of a hopper of smaller capacity than the conventional discharge cones, leading to a lighter and more compact plant. The sand discharged can also have a lower water content, because peak discharges are avoided.

Figure 7:
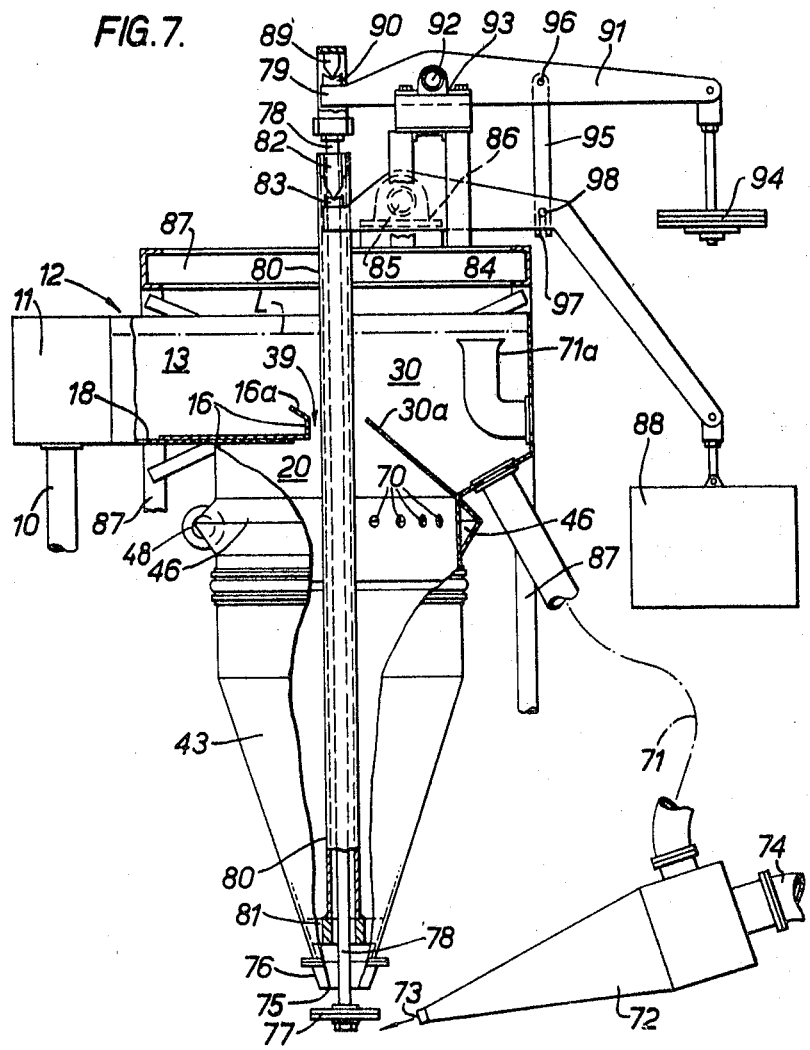
FIGURE 7 is a sectional elevation of another modification with parts shown in elevation.

FIGURE 7 illustrates a further modified construction in which the boiling box 11 and the stabilising chamber 13 are arranged as before, the floor 18 of the latter supporting the adjustable tray 16 with backwardly and upwardly inclined lip 16a. The coarse particles pass through the gap 39 into a first grading compartment 20 in which an upward current is established by a ring of nozzles 70 opening through the side wall of the compartment 20 from a volute chamber 46 surrounding the compartment and supplied with clean water through a pipe 48.

In this modification, the second graded particle compartment 30 does not discharge downwards through a vertically reciprocable, valve-controlled hopper such as that shown at 44 in the previous embodiments. Instead, the fine grade material passing over the sloping wall 30a is drawn off through an outflow pipe 71 to feed a nearly horizontal cyclone type separator 72 which, for convenience, is illustrated schematically in FIGURE 7. A constant head at the level L is maintained by an overflow pipe 71a. If desired, the compartment 30 may feed two such cyclone separators, and their fines outlets 73 may discharge either towards or away from the discharge orifice of the hopper 43. The liquid entering overflow pipe 71a contains the silt in the suspension and is mixed with the cyclone overflow 74.

FIGURE 7 also serves to illustrate an alternative hopper discharge control valve to that shown at 60 in the previous figures. In this embodiment, the outlet 75 from the hopper 43 is formed in a frustoconical discharge tip 76. Below and concentric with the outlet 75 is a disc valve 77 carried on a rod 78 which passes upwards through the hopper 43, and grading compartment 20 to a point above the classifier 12 where it terminates in a stirrup 79. The rod is guided for most of its length in a tube 80 anchored at its lower end in a spider 81 which is welded to the internal wall of the hopper.

The upper end of the tube 80 carries a pair of diametrically opposed downward-pointing hardened knife-edges 82 which are supported on hardened pads 83. The pads 83 are fixed on respective ends of a pair of parallel plates which are rigidly spaced apart to embrace the tube 80 and form a single lower lever 84. The lever 84 is pivoted at 85 in a bearing 86 carried on part of the tower structure 87 which supports the classifier 12 and cyclone separator 72. The other end of the lever 84 projects beyond the classifier 12 and supports a concrete or like mass 88 which is adjusted to balance the weight of the hopper 43 when the classifier 12 is full of water up to the level L.

The stirrup 79 carries within its closed upper end a hardened knife-edge 89 similar to the knife-edges 82 which rests on a hardened pad 90 on the adjacent end of an upper lever 91. The upper lever is pivoted at 92 in a bearing block 93 carried on the tower framework 87. The other end of this lever carries a weight 94 which balances the weight of the valve disc 77, rod 78, and the column of water standing on the valve disc 77 when its seats against the aperture 75. The weight 94 is sufficient to ensure a fluid-tight seal of the aperture.

Between the points of suspension of their respective weights 88, 94 and their fulcra 85, 92 the levers 84, 91 are releasably interconnected by a forked link 95 which is pivoted by its upper end at 96 on the upper lever 91. The forked lower end 97 of the link 95 engages over a pin 98 on the lower lever 84. The arrangement is such that if the lever 84 pivots anticlockwise in FIGURE 7, the pin 98 picks up the link 95 and pivots the upper lever 91 anticlockwise also. However, the fulcrum 85 of the lower lever 84 is nearer the knife-edges 82 on the tube 80 than is the fulcrum 92 of the upper lever 91 to the knife-edge 89. Conversely, the suspension pin 96 of the forked link 95 is nearer the fulcrum 92 than is the pin 98 to the fulcrum 85. Consequently, the downward displacement of the pad 90 on the upper lever 91 is greater than that of the pads 83 on the lower lever 84, so that the rod 78 moves down relative to the tube 80 and the valve 77 opens.

In the operation of the apparatus of FIGURE 7, when the weights 88 and 94 have been set to just more than balance the respective loads 43 and 77 with the classifier full of water, the raw suspension to be graded is pumped into the boiling box 11 and the sand bar is built up behind the inclined lip 16a on the adjustable tray 16. The particles then begin to flow over the sand bar; the coarser fraction falling through the gap 39 and the finer fraction carrying over the edge of the inclined wall 30a into the draw-off chamber 30. Here it enters the pipe 71 and is further classified by the cyclone separator 72. Meanwhile, an upward current of clean water is established through the gap 39 from the volute chamber 46 and nozzles 70, which entrains fine particles carried over into the grading compartment 20 with the coarser fraction. The fines which collect in second grading compartment 30 eventually get carried down the outflow pipe 71 to the cyclone separator which rejects silt through the silt outlet 74 and delivers fine particles at the outlet 73.

As coarse particles fall through the compartment 20 they begin to collect in the hopper 43, displacing water. As this settlement continues, the weight of the hopper increases until acting through the knife-edges 82, it overcomes the moment of the weight 88 about the pivot 85 of the lower level 84. The latter thus tilts anticlockwise. In doing so, the pin 98 picks up the forked lever 95 and tilts the upper lever 91 through a greater angle, opening the valve 77 for the discharge of the contents of the hopper 43. The system is self balancing so as to even out the flow of coarse graded particles from the hopper outlet 75.

In all embodiments of the invention, the provision for the suspension of residual fines to be discharged from the classifier at approximately the height of the mean water level permits the direct feed of this dilute suspension to a cyclone separator for recovery of the fines and their discharge at the same outlet level as the solids discharge from the classifier hopper or hoppers. This combined system results in markedly higher efficiency of separation and of recovery of usable material from the initial mixed suspension fed to the boiling box 11 of the classifier 12, and is particularly valuable in the sand and gravel industry where the development of modern varieties of concretes for different purposes demands a much more accurate grading of concreting sands and a wider variety in these gradings. Conversely, it renders practically usable lower quality starting materials which enables existing sand pits to be worked more extensively than has hitherto been possible.

By coupling one or more cyclone separators to the high-level offtake of the residual fines suspension from the classifier, a common pump can now be used to feed the raw suspension to the combined unit, whereas when, as has hitherto been customary, cyclone separators have been used independently on raw suspensions, at least double the pumping capacity has been required in order to sufficiently dilute the raw suspension to enable the cyclones to operate efficiently. Since a cyclone fed from the classifier offtake as illustrated in FIGURE 7 is now called upon only to handle fine solids, the dilution is materially increased so that gravity feed from the high-level launder is permissible. In addition, the removal by the classifier 12 of the coarser grades from the eventual feed to the cyclone 72 results in lower rates of wear of the cyclone and hence much reduced maintenance costs.

I claim:

1. A classifier for separating the particles in a raw suspension of granular solids into at least two grades comprising an open-topped tank; a flow-establishing chamber opening into said tank on one side near the top thereof and having a floor which terminates at its downstream end in a transverse upstanding lip for the establishment of a natural bar of granular material transverse to the direction of flow of the suspension; a transverse wall inclined downwards and forwards in the general direction of flow of the suspension and having its upper edge parallel to and located beyond the lip at a controllable distance therefrom and forming an adjustable gap means for presetting such gap; a first grading compartment open at its upper and lower ends, the opening being defined by said gap; a second upwardly open grade compartment beyond said gap defined on its upstream side by said inclined wall and having a discharge orifice at its lower end; a fine particle suspension overflow having an open mouth located at a predetermined level above said gap; a discharge hopper opening at its upper end into a bottom portion of said tank vertically below at least one of said grading compartments; a flexible seal between said hopper and said tank; load-balancing means supporting said hopper for vertical reciprocation thereof in response to variations in the weight of solids therein; a discharge valve at the lower end of said hopper; means operated by said vertical reciprocation for controlling said hopper discharge valve and means for introducing clean liquid into said bottom portion of said tank above said hopper for establishing an upward countercurrent flow for entraining fine grade particles carried down through said gap with coarser grade particles.

2. A classifier according to claim 1, wherein said means for introducing clean liquid includes a volute chamber surrounding said bottom portion of said tank above said hopper and having apertures communicating between said chamber and said bottom portion, and means for delivering countercurrent liquid to said volute chamber.

3. A classifier according to claim 2, wherein said fine particle suspension overflow comprises a pipe having an upwardly open end constituting said open mouth, the open end of said pipe being located below the rim of said open-topped tank at a point within said second grading compartment.

4. A classifier according to claim 2, wherein said fine particle suspension overflow comprises a weir adjacent the upper edge of said tank for controlling the level of liquid in the classifier, said fine particle suspension overflow further including a launder mounted externally of said weir to collect the suspension flowing thereover and a fine particle offtake leading from said launder.

5. A classifier according to claim 1, wherein at least one of said grading compartments has a variable obturator located in the lower open end therof and means for adjusting the position of said obturator with respect to the opening in said lower end for controlling the rate of said charge from such grading compartment.

6. A classifier according to claim 5, wherein said obturator comprises a coned head, a vertical stem at the lower end of which is mounted said coned head with its axis vertical and a float secured to the upper end of the stem adapted to be supported by the liquid suspension in the tank.

7. A classifier according to claim 6, wherein said obturator stem is tubular and extends below said cone head and above said float, and which further includes radial distribution nozzles opening outwards from the interior of said tubular stem at its lower extremity, and liquid supply means connected to the upper extremity of said stem.

8. A classifier according to claim 1, wherein said open-topped tank is provided with a transverse partition extending between said grading compartments, and which further includes a second vertically reciprocable hopper flexibly sealed to the bottom of said tank below a second of said grading compartments in the same manner as said first-named hopper.

9. A classifier according to claim 1, wherein said tank surrounds at least one of said grading compartments with clearance on at least two sides, and has its open upper end above the normal level of liquid in the classifier.

10. A classifier according to claim 1, wherein said tank surrounds said second grading compartment, and said discharge hopper is mounted below said second grading compartment and which further includes a second discharge hopper mounted on the lower open end of said first grading compartment for vertical reciprocation in the same manner as said first-named discharge hopper.

11. A classifier according to claim 1, wherein said load-balancing means comprises a weighbeam above said open-topped tank and a vertical suspension member passing axially upwards through said hopper from a point adjacent the lower end thereof to said weighbeam, a spider securing said suspension member to said hopper, and a pivotal coupling between the upper end of said suspension member and said weighbeam.

12. A classifier according to claim 11, wherein said suspension member comprises a vertically disposed tube, and which further includes a valve rod passing through said tube, a valve mounted on the lower end of said rod for cooperation with the discharge opening at the lower end of said hopper, a separate valve control weighbeam disposed vertically above said hopper and supporting the upper end of said valve rod, the distance between the fulcrum of said hopper weighbeam and said suspension member being less than the distance between the fulcrum of said valve control weighbeam and said valve rod, a lost motion connection being provided between said weighbeams in order to ensure simultaneous tilting of both weighbeams when said hopper contains a predetermined weight of graded material, said valve control weighbeam tilting through a greater angle than said hopper weighbeams.

References Cited

UNITED STATES PATENTS

| | | | |
|---|---|---|---|
| 1,672,448 | 6/1928 | Clouwez | 209—157 |
| 2,277,817 | 3/1942 | Counselman | 209—157 X |
| 2,369,878 | 2/1945 | Wiegand | 209—496 |
| 2,646,169 | 7/1953 | Fox | 209—158 X |
| 2,817,441 | 12/1957 | Leeman | 209—211 |
| 3,258,121 | 6/1966 | Ley | 209—160 |

FOREIGN PATENTS

| | | |
|---|---|---|
| 138,905 | 9/1920 | Great Britain. |
| 779,013 | 7/1957 | Great Britain. |

FRANK W. LUTTER, Primary Examiner

U.S. Cl. X.R.

209—159, 211, 496; 222—58